(12) United States Patent
Haviland

(10) Patent No.: US 10,195,618 B2
(45) Date of Patent: Feb. 5, 2019

(54) SPRAY NOZZLE AND SPRAY NOZZLE SYSTEM

(71) Applicant: Sean Haviland, Knoxfield (AU)

(72) Inventor: Sean Haviland, Knoxfield (AU)

( * ) Notice: Subject to any disclaimer, the term of this patent is extended or adjusted under 35 U.S.C. 154(b) by 388 days.

(21) Appl. No.: 14/772,674

(22) PCT Filed: Jun. 5, 2013

(86) PCT No.: PCT/AU2013/000590
§ 371 (c)(1),
(2) Date: Sep. 3, 2015

(87) PCT Pub. No.: WO2014/134653
PCT Pub. Date: Sep. 12, 2014

(65) Prior Publication Data
US 2015/0375242 A1 Dec. 31, 2015

(30) Foreign Application Priority Data
Mar. 6, 2013 (WO) ................ PCT/AU2013/000215

(51) Int. Cl.
*B05B 1/30* (2006.01)
*B05B 1/32* (2006.01)
(Continued)

(52) U.S. Cl.
CPC .......... *B05B 1/3073* (2013.01); *A01C 23/007* (2013.01); *A01C 23/008* (2013.01); *A01C 23/047* (2013.01); *A01M 7/005* (2013.01); *A01M 7/0042* (2013.01); *A01M 7/0089* (2013.01); *B05B 1/044* (2013.01);
(Continued)

(58) Field of Classification Search
CPC ....... B05B 1/044; B05B 1/262; B05B 1/3073; B05B 1/32; B05B 12/126; A01C 23/007; A01C 23/008; A01C 23/047; A01M 7/0042; A01M 7/0089
See application file for complete search history.

(56) References Cited

U.S. PATENT DOCUMENTS 3,100,083 A * 8/1963 Wardrup ................ A01G 25/16
239/452
3,552,658 A * 1/1971 Sons ........................ B05B 1/267
239/456
(Continued)

OTHER PUBLICATIONS

Notification of transmittal of the international search report and the written opinion of the international searching authority, dated Aug. 21, 2013.

*Primary Examiner* — Ryan A Reis
(74) *Attorney, Agent, or Firm* — Garvey, Smith & Nehrbass, Patent Attorneys, L.L.C.; Seth M. Nehrbass; Julie R. Chauvin

(57) ABSTRACT

A variable orifice spray valve including a valve body (42) having a spray discharge orifice (42A) formed therein. The spray valve further includes a liquid flow passage into the valve body, a deflector plate (45) in proximity to the spray discharge orifice (42A) onto which liquid discharged from the orifice is directed, a spray height adjuster (44) adjacent the orifice and movable relative to the deflector plate (45) into the liquid flow path from the orifice, and an adjustment mechanism (43) to adjust the position of the spray height adjuster (44) relative to the discharge orifice (42A).

20 Claims, 13 Drawing Sheets

(51) Int. Cl.
| | |
|---|---|
| *A01C 23/04* | (2006.01) |
| *A01M 7/00* | (2006.01) |
| *B05B 12/12* | (2006.01) |
| *E01C 19/17* | (2006.01) |
| *B05B 1/04* | (2006.01) |
| *B05B 1/26* | (2006.01) |
| *E01H 3/02* | (2006.01) |
| *A01C 23/00* | (2006.01) |

(52) U.S. Cl.
CPC .............. *B05B 1/262* (2013.01); *B05B 1/267* (2013.01); *B05B 1/30* (2013.01); *B05B 1/32* (2013.01); *B05B 12/126* (2013.01); *E01C 19/17* (2013.01); *E01H 3/02* (2013.01)

(56) References Cited

U.S. PATENT DOCUMENTS

| | | | | |
|---|---|---|---|---|
| 4,167,247 | A * | 9/1979 | Sons | B05B 1/267 239/455 |
| 5,785,246 | A | 7/1998 | King et al. | |
| 5,911,363 | A * | 6/1999 | Oligschlaeger | A01M 7/0089 239/11 |
| 2009/0241817 | A1 * | 10/2009 | Eastin | A01C 1/06 111/118 |
| 2011/0220736 | A1 * | 9/2011 | Anderton | B05B 1/044 239/222.11 |

* cited by examiner

SPRAY NOZZLE AND SPRAY NOZZLE SYSTEM

FIELD OF THE INVENTION

This invention relates to a spray nozzle and a spray nozzle control and particularly to a system and apparatus for maintaining a set water spray coverage on the ground from a vehicle. The invention may also be used for providing consistent spray coverage from a vehicle of liquid products such as fertilizers, pesticides and herbicides used in agricultural applications.

BACKGROUND OF THE INVENTION

On unsealed roads and in particularly mine haul roads, it is necessary to spray water on the roads in order to reduce the amount of dust generated by vehicles travelling over these roads. Where the amount of water sprayed onto a road is not managed correctly, there is a tendency for the road to be either over watered or under watered. Over watering can make the unsealed roads slippery and more difficult to negotiate resulting in vehicle accidents, longer journey times and therefore increased time moving the product from source to destination. This results in an overall reduction in the productivity of the road itself.

In contrast, under watering can result in health issues to the drivers and other employees due to the poor control of dust spread by the use of the vehicles on the road. Furthermore, at many mine sites, water is a valuable and rare asset and poor water spraying practices consequently wastes the valuable water resource with no real benefit.

In order to manage the water, a useful spraying practice is to spread water on the unsealed roads at a rate relative to the ground speed ie. a constant rate or a pre-calibrated rate irrespective of the vehicle speed. In simple terms, as the vehicle speeds up, more water is sprayed from the vehicle. As the vehicle slows down, less water is sprayed. This results in a constant water rate being sprayed onto the ground providing a constant water coverage on the ground.

One method to control the water spray rate and provide a constant coverage on the ground is to control the speed of the hydraulic motor driving the water pump using electronics relative to the ground speed. This controls the water pressure exiting the water pump. As the water is delivered onto the road by a fixed orifice, the amount of water delivered through the orifice varies according to the pressure which is in turn dictated by the speed of the vehicle. This method requires a considerable and expensive amount of changes to the hydraulic drive system that runs the water pump.

The problem of providing a set rate of liquid spray coverage from a vehicle is also present in the agricultural industry where chemicals mixed in a tank on a vehicle need to be sprayed at predetermined spray coverage rates. While the invention has been directed to the spraying of water from a vehicle, the invention is also applicable to other applications of liquid from a moving vehicle such as the spraying of agricultural chemicals.

It is an object of the invention to provide a liquid delivery system which is an alternative to those previously provided:

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In one aspect there is provided a variable flow rate spray system for providing a distribution of liquid from a vehicle including
   a pump for supplying pressurised liquid to at least one orifice valve;
   a speed determinant device providing an output representative of the relative speed of the vehicle; and
   a flow rate controller controlling the flow of liquid from the at least one orifice valve and responsive to the output of the speed determinant device, the flow rate controller including;
   a valve adjustment device; including
   a hydraulic operated pressure reducing valve between the pump and at least one orifice valve,
   the controller being configured to provide an output to the valve adjustment device to vary the flow rate of liquid from the at least one orifice valve.

In another aspect of the invention there is provided a system for delivering a distribution of liquid sprayed from a vehicle, the vehicle having a pump to supply pressurised water to at least one orifice valve, the system including
   a speed determinant device providing an output representative of the relative speed of the vehicle; and
   a flow rate controller controlling the flow of liquid to the at least one orifice spray valve and responsive to the output of the speed determinant device, the flow rate controller including
   a valve adjustment device including a hydraulic operated pressure reducing valve, the controller being configured to provide an output to the valve adjustment device to vary the flow rate of liquid from the at least one orifice valve.

In a further aspect of the invention there is provided a method of delivering a distribution of liquid from a moving vehicle comprising the steps of
   providing a pressurised source of liquid to at least one orifice valve,
   providing a flow rate controller including an hydraulic operated pressure reducing valve,
   providing an output from a speed determinant device representative of the relative speed of the vehicle to a flow rate controller, the controller being configured to provide an output to a valve adjustment device to vary the flow rate of liquid from the at least one orifice valve.

In the above aspects of the invention, in one preferred form of the invention, the pressure reducing valve is responsive to the speed determinant device, the pressure reducing valve varying the pressure and hence flow rate of liquid delivered to the orifice valve. The pressure reducing valve may be a hydraulic operated proportional pressure reducing valve.

The orifice valve may be a fixed orifice spray valve or a variable orifice spray valve.

In another preferred form of the invention the at least one orifice valve is a variable orifice spray valve which is responsive to the speed determinant device. The pressure reducing valve is a hydraulic operated pressure reducing diaphragm valve or a hydraulic operated proportional pressure reducing diaphragm valve.

In one embodiment of the invention, the valve adjustment device includes a hydraulic operated pressure reducing valve which controls the liquid pressure to a variable orifice spray valve.

In a second preferred embodiment of the invention, the valve adjustment device includes a hydraulic operated proportional pressure reducing valve which, controls the liquid pressure to a fixed orifice spray valve.

In a third preferred embodiment of the above aspects of the invention, the valve adjustment device includes a hydraulic operated proportional pressure reducing valve which controls the liquid pressure to a variable orifice spray valve.

A further aspect of the invention provides a variable orifice spray valve including a valve body having a spray discharge orifice formed therein;
a liquid flow passage into the valve body;
a deflector plate in proximity to the spray discharge orifice onto which liquid discharged from the orifice is directed;
a spray height adjuster adjacent the orifice and movable relative to the deflector plate into the liquid flow path from the orifice; and
an adjustment mechanism to adjust the position of the spray height adjuster relative to the discharge orifice.

In a preferred form of this aspect, the spray height adjuster is provided with a sloped leading edge which directs the liquid path from the orifice towards the deflector plate. The adjustment mechanism may include an actuator, preferably an electric actuator, responsive to a controller. The actuator preferably is in proximity to the spray height adjuster and cooperates with the spray height adjuster through one or more lever mechanisms which moves the spray height adjuster relative to the deflector plate. The relative movement may also move the spray height adjuster relative to the orifice to affect the liquid being discharged from the spray orifice.

In an embodiment, the actuator is an electric actuator having a shaft connected to a toggle by a first connecting rod, the toggle being mounted to the spray body. The toggle which is in the form of a lever is connected by a second connecting rod to the spray height adjuster. Rotation of the shaft of the electric actuator produces movement of the first connecting rod which in term produces a corresponding movement of the second connecting rod through the toggle. Movement of the second connecting rod causes a corresponding of the spray height adjuster.

As the spray height adjuster is moved into the path of the liquid exiting the valve body through the orifice, the stream narrows.

BRIEF DESCRIPTION OF THE DRAWINGS/FIGURES

BRIEF DESCRIPTION OF THE EMBODIMENTS

Figure 1:
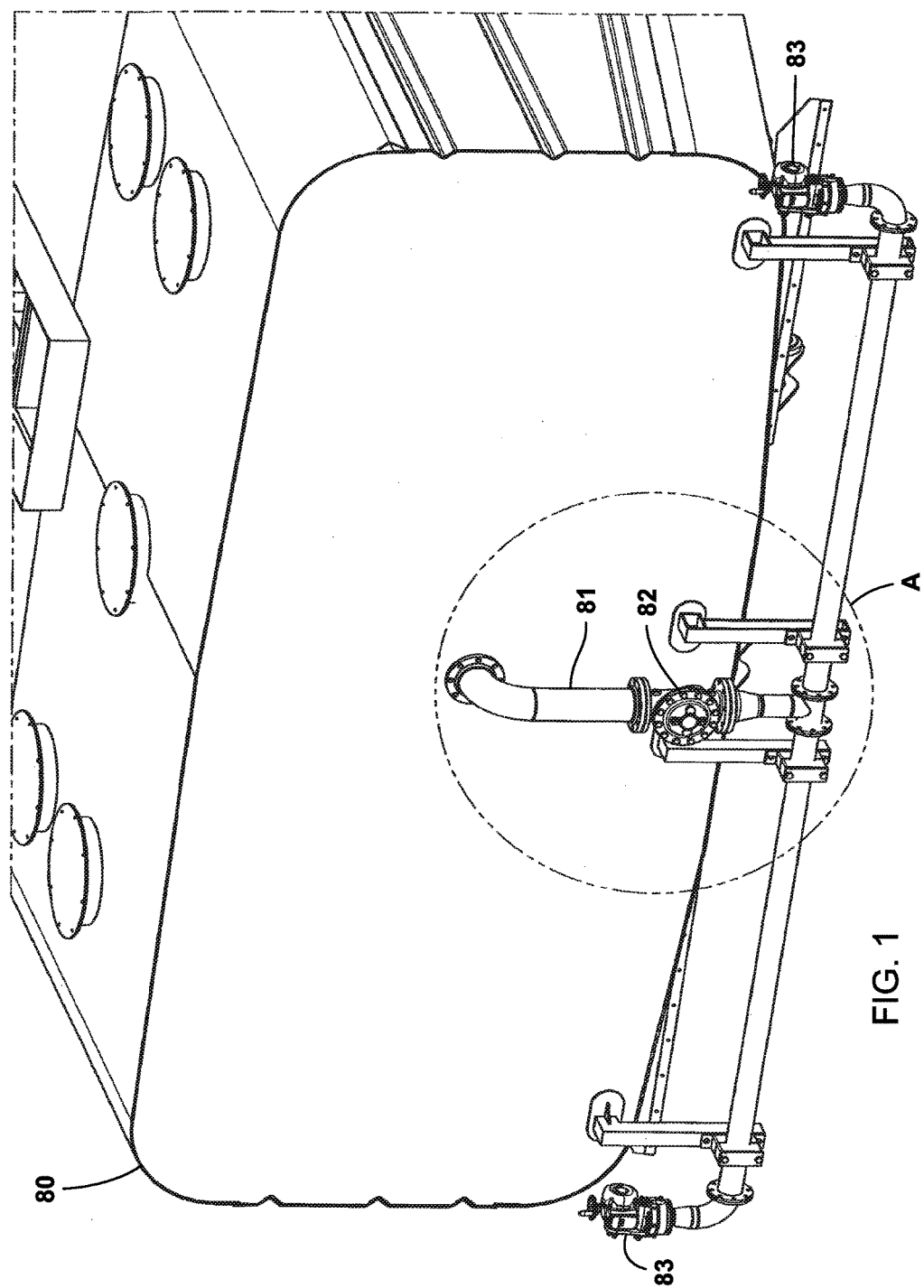
FIG. 1 is an illustration of a system according to the invention positioned on a water tank.
Figure 2:
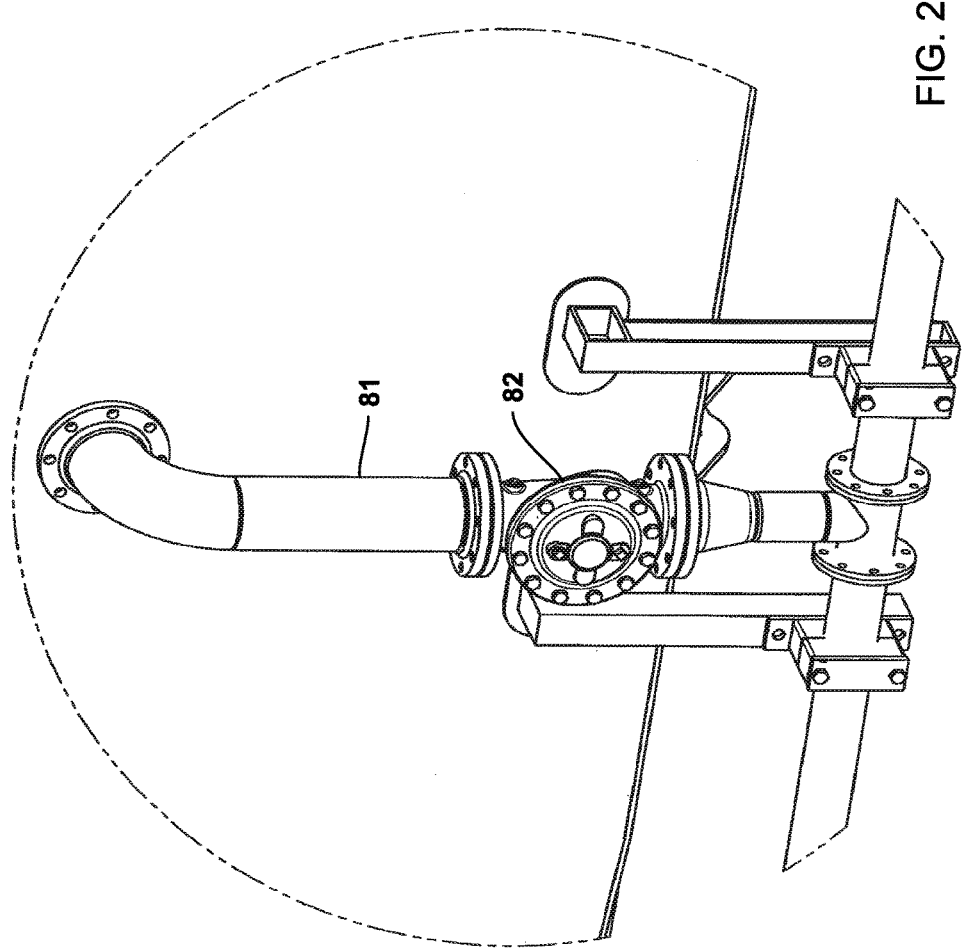
FIG. 2 is an exploded view of insert A in FIG. 1.

FIG. 1 shows a rear of a tanker mounted with a spray system according to one aspect of the invention. The tanker has a reservoir 80 having a conduit 81 supplied by a hydraulically operated centrifugal pump (not shown). The conduit is fitted with a hydraulically operated diaphragm valve 82 supplying two variable orifice spray valves 83. In this instance the valves 83 shown in FIG. 1 are also those shown in FIG. 3-5. FIG. 2 is an enlarged view of section A in FIG. 1.

Figure 6:
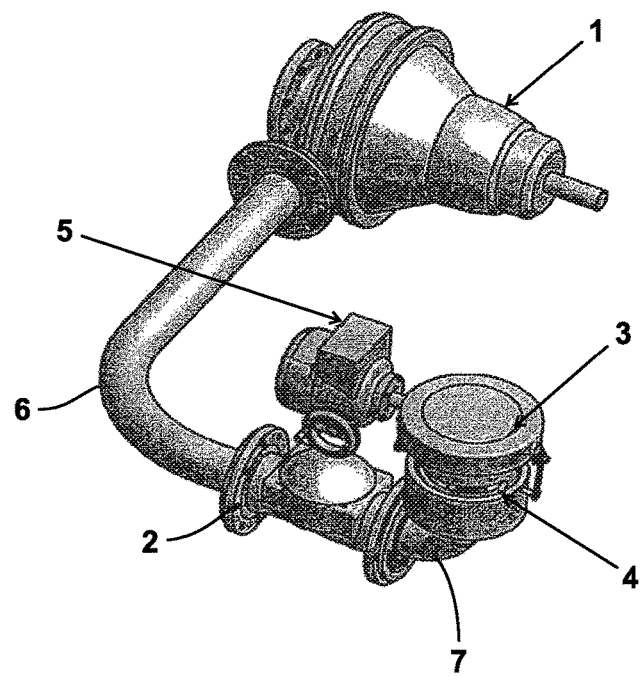
FIG. 6 is a perspective view of a pump connected to a variable orifice spray valve through a pressure reducing valve in accordance with a first embodiment of the invention.
Figure 7:
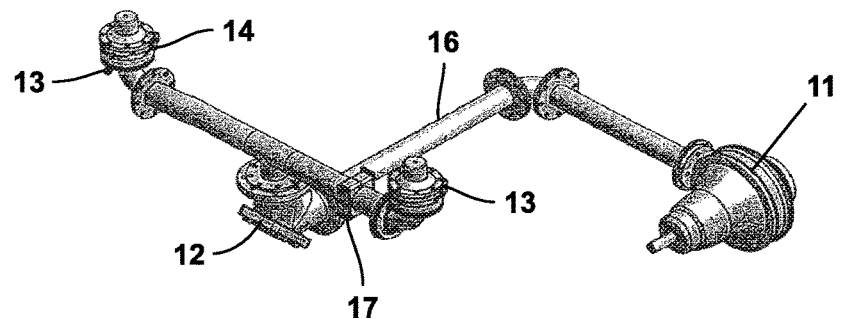
FIG. 7 is a perspective view of a pump connected to two fixed orifice spray valves through a proportional pressure reducing valve in accordance with a second embodiment of the invention.
Figure 8:
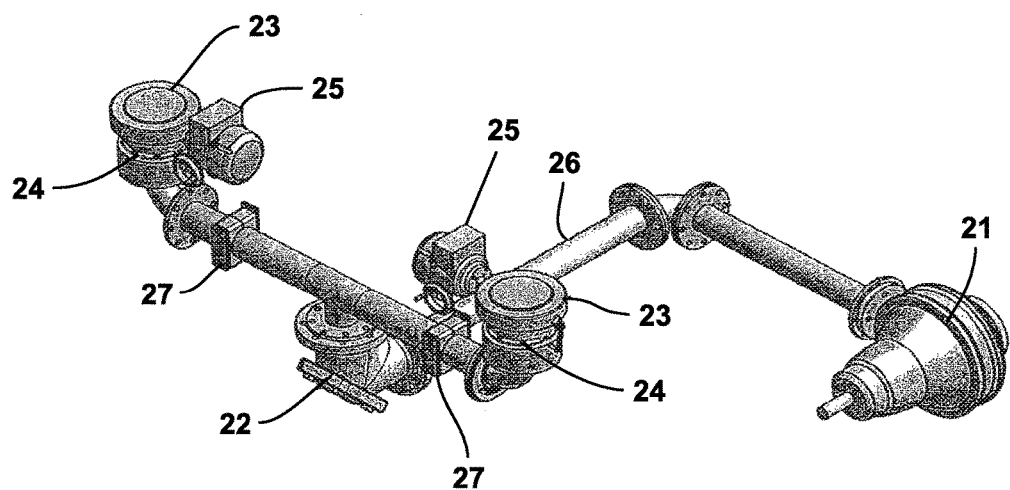
FIG. 8 is a perspective view of a pump connected to two variable orifice spray valves through a proportional pressure reducing valve in accordance with a first embodiment of the invention.
Figure 10:
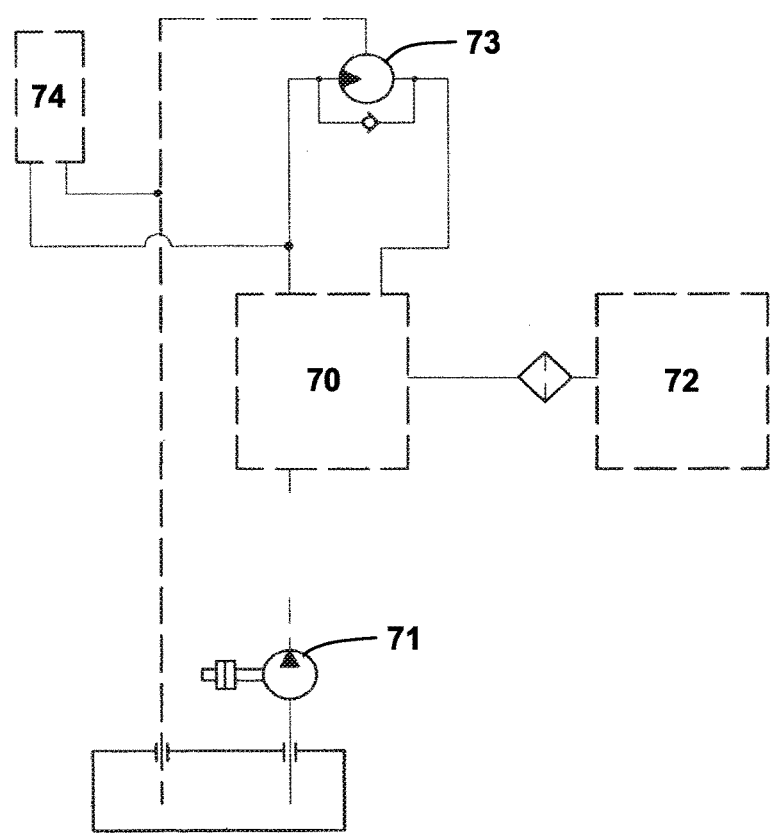
FIG. 10 is a diagram illustrating a typical hydraulic circuit incorporating the variable flow rate spray system on a vehicle.

Referring to FIGS. 6, 7, 8 and in which three embodiments of the variable spray rate control system of the invention are shown. The variable flow rate spray system according to the embodiments of the invention is used in conjunction with a pump 1, 11, 21 which ideally is a centrifugal pump. The pump delivers liquid to the main supply line, conduits 6, 16, 26 at a pressure and flow rate dependent upon the speed with which the pump is driven in a conventional manner. As shown in FIG. 1, the centrifugal water pump 1 is driven by a fixed displacement hydraulic motor which is connected to a hydraulic supply pump, not shown. The hydraulic pump for supplying the hydraulic motor may be part of the conventional system provided on a vehicle for the operation of various hydraulic controls. The pump may be operated by a take off from the vehicle engine and operated at a speed close to engine speed. In FIG. 10, the water pump control valve 70 is shown diverting hydraulic fluid from a hoist pump 71 on the vehicle 72 to the hydraulic motor 73 running the centrifugal pump and an optional water cannon 74. The major advantage of this system is that there is minimum interfacing with the rest of the vehicles hydraulic and electrical system and so minimum disruption to the original vehicle setup.

In the embodiments of FIGS. 6, 7 and 8, the pressurised liquid output from the centrifugal pump 1, 11, 21 passes through a conduit 6, 16, 26 to a hydraulic operated pressure reducing diaphragm valve 3, 13, 23. In these embodiments the conduit may be provided with a monitor bearing 7, 17, 27 to enable the pressure reducing valve 3, 13, 23 to be rotated relative to the conduit 6, 16, 26.

A controller 90 receives an output from a speed determinant device, such as a GPS ground speed sensor 93 representative of the relative speed of the vehicle. The ground speed determinant device may also be one or more of a Doppler radar speed transducer or a mechanical connection to the gearbox or vehicle as sources of the ground speed. The ground speed determinant device may also be a vehicle network system (under protocol J1939) which provides information such as ground speed on vehicles linked into the network. Such a system may be used in conjunction with or as an alternative to a GPS ground speed sensor or other means of determining ground speed.

In the case of a GPS, the output is detected from a GPS antenna 92. The controller determines the difference in speed from a calibrated vehicle speed and makes corresponding adjustments to the signal output to a valve adjustment device. In one embodiment, the valve adjustment device includes hydraulic operated proportional pressure reducing diaphragm valves 3, 13, 23 (FIGS. 6, 7 and 8). These adjustments vary the pressure on the spray head side of the reducing valve and hence produce a corresponding adjustment in the flow rate of water distributed from the spray valves 5, 15, 25.

The controller 90 may also be provided with an incline switch 94 which provides an output to the controller 90 representative of the inclination of the vehicle from the horizontal. Corrections may then be made to the pressure on the spray head side of the reducing valve to maintain the substantially constant preset distribution rate of water on the ground.

The invention is for the spreading of water from a water cart onto the ground at a pre-set or variable rate relative to ground speed for the purpose of dust suppression, road construction and road maintenance. Controlling the output of water requires either at least one fixed orifice or variable orifice with control over the water pressure. The invention uses a pressure reducing valve which is preferably a diaphragm actuated hydraulic operated pressure reducing valve or a diaphragm actuated hydraulic operated proportional pressure reducing valve to control the water pressure and an orifice valve which may be a fixed or variable orifice to control the water output. One or both of the hydraulic actuated pressure reducing diaphragm valve or the orifice valve should be variable and controlled by the controller 90. The following combinations of reducing valves and orifice valve may be used in order to control the spread rate of water on the ground:

FIG. 6 shows the spraying system of the first embodiment using a single spray valve, specifically, a variable orifice spray valve with a fixed water pressure controlled by a diaphragm actuated hydraulic operated pressure reducing valve 2. This system has the advantage in that the width of spray will remain constant and thus it is possible to calculate the spread rate onto the ground.

In this embodiment, the pump is a centrifugal water pump 1 driven by a fixed displacement hydraulic motor at a speed close to engine speed. This means the water pump runs at a speed between 1200 RPM and 2400 RPM. The output pressure and flow from the water pump will be relative to the running speed of the water pump Water from the centrifugal pump 1 is fed into the diaphragm actuated hydraulic operated pressure reducing valve 2. The pressure reducing valve 2 controls the pressure to a preset, substantially constant and calculated value.

Figure 9:
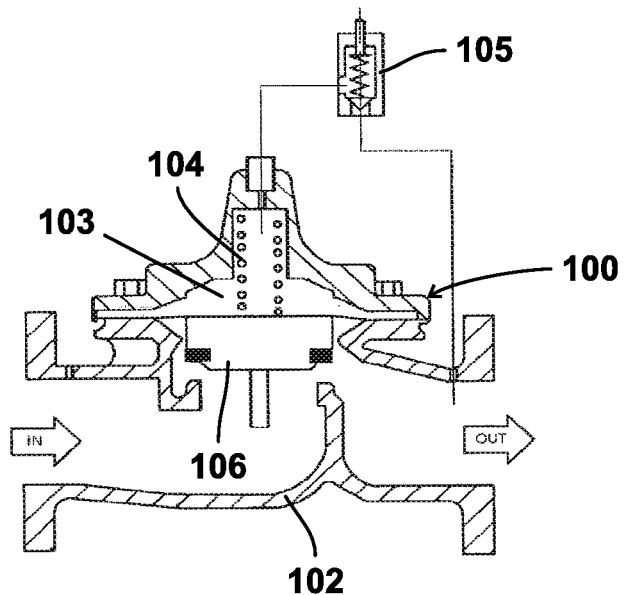
FIG. 9 is sectional view of a hydraulic actuated pressure reducing diaphragm valve.

FIG. 9 discloses a diaphragm valve used as a pressure reducing valve 100. Pressure reducing valves are a normally open valve. The fluid pressure is reduced by taking a permanent pressure drop across the valve. This is accomplished by a variable flow area inside the valve. The typical set up involves a spring and diaphragm that are connected to a pintle or other device that regulates the flow opening in the valve. The spring is adjusted to the desired outlet pressure by compression or relaxation. The incoming fluid pressure reacts against the spring/diaphragm force to create equilibrium of forces. So if the incoming pressure goes up, the force on the diaphragm goes up and causes the spring load to increase. When downstream pressure is lower than the pressure corresponding to the setting on the pressure control valve 105, the diaphragm 106 in the diaphragm valve will be open. When the incoming pressure increases and the pressure setting on the pressure control valve 105 is achieved, water is passed from the Out port of the valve via the pilot circuit to the diaphragm chamber 103. This results in the diaphragm 106 moving towards the closed position. When the inlet pressure drops, the load on the diaphragm decreases and the spring extends to lessen its force and causes the pintle to open the flow area. Thus in operation, the diaphragm 106 is continuously moving between open and close in order to maintain the preset outlet side pressure in a modulating process.

In FIG. 6, the orifice valve 3 is a variable orifice valve and consists of an orifice 4 that can be variably opened and closed by an electric motor (5), the electric motor has a position control system built into it that responds to a electrical control signal. A typical electrical control signal is 4-20 milliamp, 0 to 10 Volt or 0 to 5 Volt signal. Using the electric motor (5), it is possible to open the orifice (4) on the spray valve to a pre-calculated opening corresponding to a setting in a variable range of office openings.

Using the above embodiment, it is possible to place one of a number of pre-set calculated amounts of water on the road depending on the orifice opening with the pressure upstream of the orifice valve 3 regulated to a fixed pre-set pressure and the orifice on the orifice valve 3 opened to a calculated position.

The diaphragm actuated hydraulic operated pressure reducing valve 2, 100 is also used as the water ON/OFF valve in this embodiment.

In the second embodiment shown in FIG. 7, a fixed orifice spray valve 13 with a variable water pressure controlled by a diaphragm actuated hydraulic operated proportional pressure reducing valve 12 is shown. In this embodiment, standard fixed orifice spray valves 13 are used. A proportional pressure reducing valve is a reducing valve with the pressure adjusted by an electronic signal.

Figure 11:
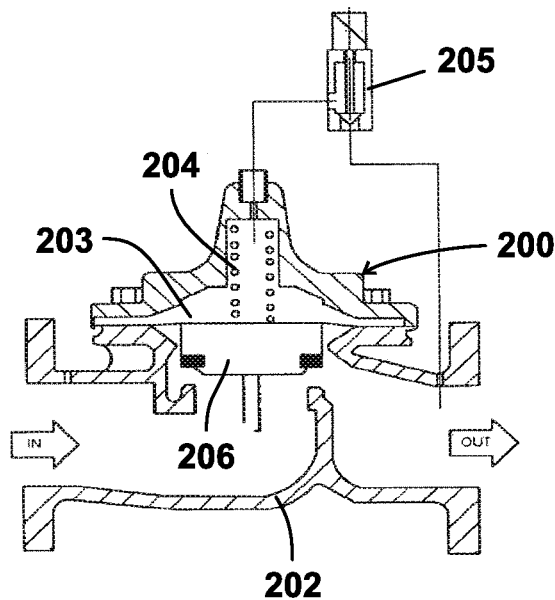
FIG. 11 is a sectional view of a hydraulic actuated proportional pressure reducing diaphragm valve.

FIG. 11 shows the operation of the diaphragm valve as a proportional pressure reducing valve. The operation of the proportional pressure reducing diaphragm valve 200 is identical to the valve 100 described above. The difference is the spring in pressure control valve 105 is replaced by a force solenoid 205. The force solenoid produces a force relative to a 0 to 10 volt signal and that 0 to 10 volts is proportional to a reference pressure. The typical set up involves a force solenoid 205 and diaphragm 206 that are connected to a pintle or other device that regulates the flow opening in the valve. The spring 204 is adjusted to the desired outlet pressure by compression or relaxation. The incoming fluid pressure reacts against the spring/diaphragm force to create equilibrium of forces. So if the incoming pressure goes up, the force on the diaphragm goes up and causes the spring load to increase. When downstream pressure is lower than the pressure corresponding to the setting on the solenoid 205, the diaphragm 206 in the diaphragm valve will be open. When the incoming pressure increases and the pressure setting on the solenoid 205 is achieved, water is passed from the out port of the valve via the pilot circuit to the diaphragm chamber 203. This results in the diaphragm 206 moving towards the closed position. When the inlet pressure drops, the load on the diaphragm decreases and the spring extends to lessen its force and causes the pintle to open the flow area. Thus, in operation, the diaphragm 206 is continuously moving between open and close in order to maintain the preset outlet side pressure in a modulating process.

Figure 12:
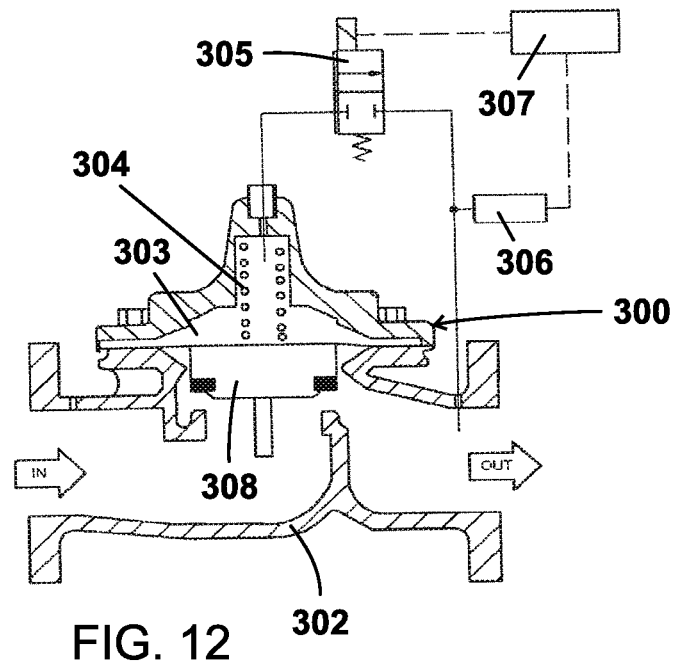
FIG. 12 is a sectional view of a diaphragm valve used a closed loop proportional reducing valve.

It is also possible to operate the proportional pressure reducing diaphragm valve (300) with a pressure transducer 306 with a black box 307 and a proportional or On/Off Valve 305 to replace the pressure control valves in Items 306 and 307 above. This is shown in FIG. 12. Once again, the operation of this system is identical to the valves 100, 200 described above.

Figure 13:
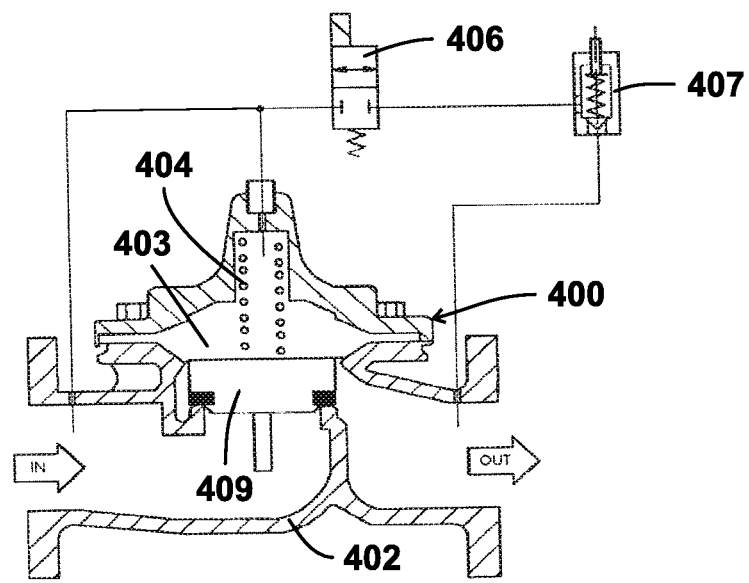
FIG. 13 is a sectional view of a diaphragm valve used as an open/close/pressure reducing valve in its closed position.

In another form of proportional pressure reducing diaphragm valve 400 shown in FIG. 13, the diaphragm valve is such that a number of pilot systems can easily be built onto one valve and the valve will operated in a manner as dictated by the pilot system. In this example, use is made of the reducing valve function as well as the shut-off valve 406 function. In this example, a pressure control valve 407 is in the pilot line with a on/off valve 406.

In FIG. 7, the spraying system of this embodiment uses two spray valves. In this embodiment, the centrifugal water pump 11 is driven by a fixed displacement hydraulic motor at a speed close to engine speed. This means the water pump runs at a speed between 1200 RPM and 2400 RPM. The output pressure and flow from the water pump will be relative to the running speed of the water pump Water from the centrifugal pump 11 is fed into the diaphragm actuated hydraulic operated proportional pressure reducing valve 12. FIG. 9 shows a version of the pressure reducing valve that has ports located at 90 degrees to one another instead of the inline as illustrated in FIG. 6. The main stage of the valve is identical to the valve described in FIG. 6. The pilot stage of the valve has been changed to a proportional pressure control valve. The proportional pressure control valve adjusts the output pressure on the orifice valve side of the pressure reducing valve 12 relative to an electrical control signal. Maximum signal level sets the valve to maximum pressure setting. Half the signal level sets the valve to half of the maximum pressure setting. Typical electrical control signals used are 4-20 milli-amps, 0 to 10 Volt or they may alternatively be a 0 to 5 Volt signal.

When using this embodiment, it is possible to place a pre-set calculated amount of water on the road with the pressure upstream of the orifice spray valve 13 varied to a pre-set calculated pressure and the orifice on the orifice valve 13 fixed. The diaphragm actuated hydraulic operated pressure reducing valve 12 may also used as the water ON/OFF valve in this embodiment.

In the embodiment of FIG. 8, a variable orifice spray valve with a water pressure variable controlled by a diaphragm actuated hydraulic operated proportional pressure reducing valve is shown. Hence in this embodiment both the hydraulic actuated proportional pressure reducing diaphragm valve and the one or more orifice valves are variable. In regard to the operation of the variable orifice valves and the spraying system is shown using 2 spray valves 23. The centrifugal water pump 21 is driven by a fixed displacement hydraulic motor at a speed close to engine speed. This means the water pump runs at a speed between 1200 RPM and 2400 RPM. The output pressure and flow from the water pump will be relative to the running speed of the water pump. The hydraulic actuated proportional pressure reducing diaphragm valve 22 is able to vary the pressure on the supply side of the orifice valve according to a manual setting or in response to an electrical signal for the controller. The orifice spray valves 23 consists of an orifice 24 that can be opened and closed by an electric motor 25 over a variable range of opening settings. The electric motor has a position control system built into it that responds to a electrical control signal. A typical electrical control signal is 4-20 milliamp, 0 to 10 Volt or 0 to 5 Volt signal. Using the electric motor 25, it is possible to open the orifices 24 on the spray valves to one of a range of pre-calculated openings to affect the spread of water from the orifice.

Figure 4:
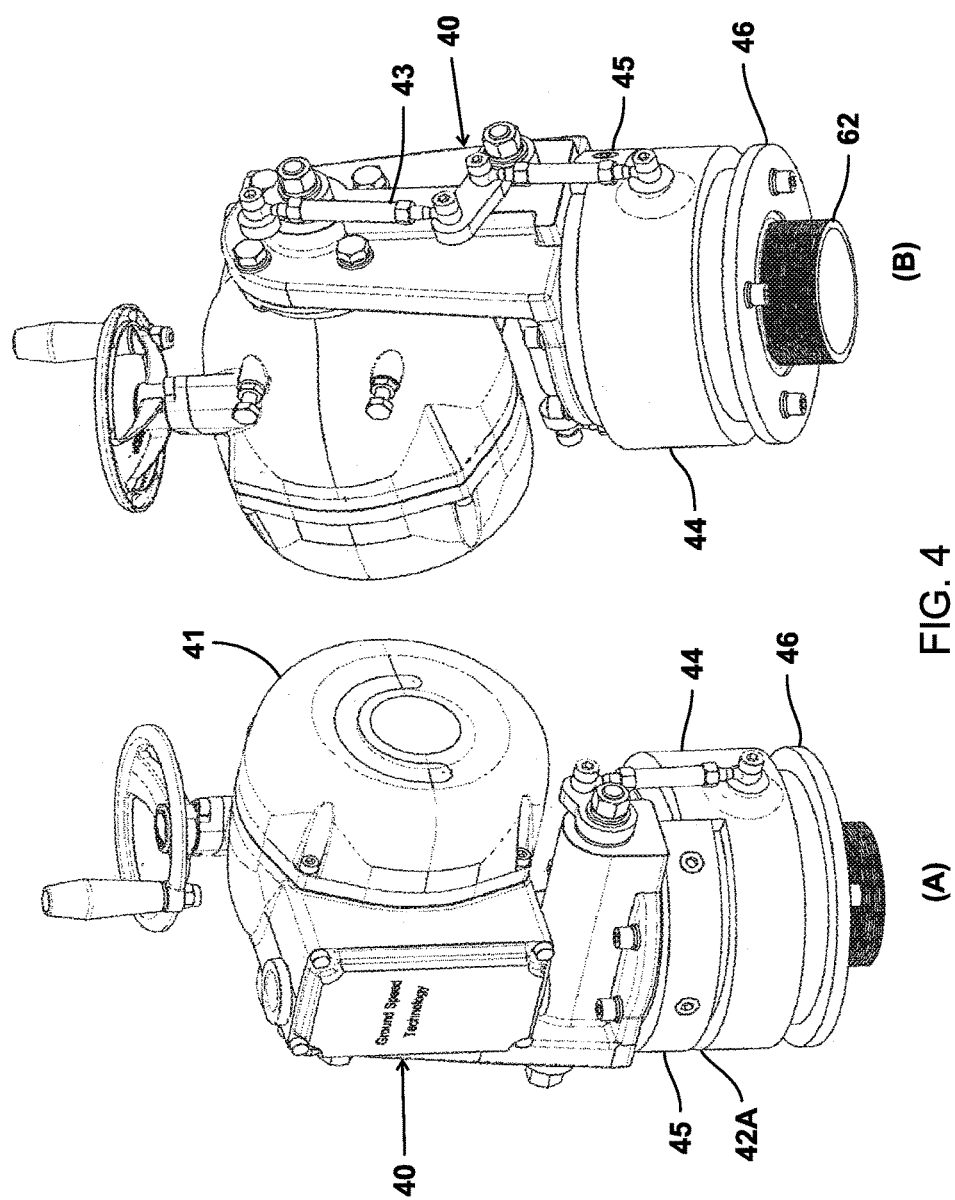
FIGS. 4A and 4B are perspective views of the variable orifice spray valve of FIG. 3 in an assembled state.
Figure 5:
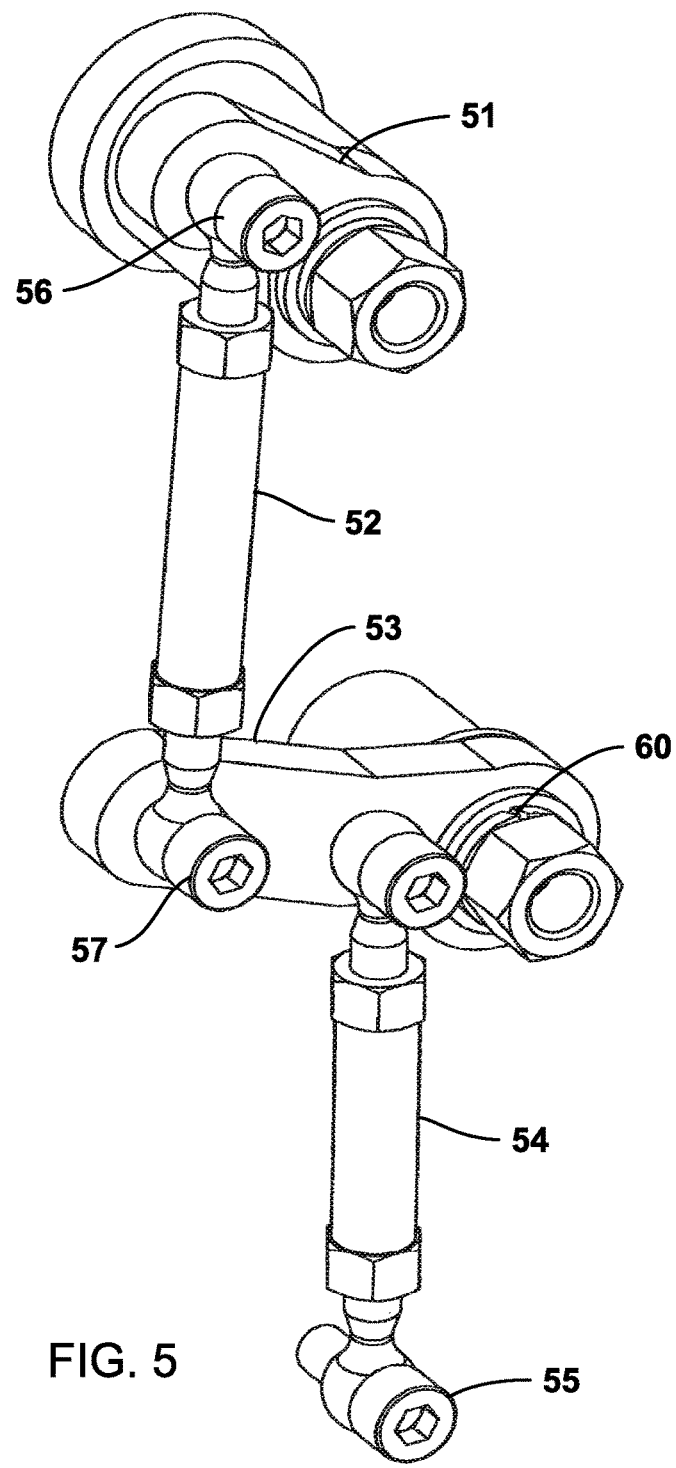
FIG. 5 is a perspective view of the adjustment mechanism for the spray height adjuster used in the variable orifice spray valve of FIG. 3.

The embodiment of FIG. 8 is a combination of the embodiments of FIGS. 4 and 5, in that the system of FIG. 8 may be used on a water cart to spread water onto the ground at a pre-set calculated rate or at a variable rate relative to ground speed with no calculations for the purpose of dust suppression, road construction and road maintenance. The controller required for will have to have a greater calculating capacity than the controller needed for the embodiments of FIGS. 6 and 7.

In other possible combinations within the scope of the invention, a variable orifice valve with a pressure reducing valve may be set up in a manner to act as a compensator for the orifice. This system is very similar to the method described in 6. In situations where high accuracy is required, the embodiments of 6, 7, and 8 may be set up with a flow meter (not shown) as the feedback device. The feedback device, using the electronic control system will match the exact calculated flow using the variable orifice or the diaphragm actuated hydraulic operated proportional pressure reducing valve.

Within the scope of the invention, there is a variable orifice spray valve to be used on a water cart to spread water onto the ground at a pre-set calculated rate relative to ground speed or at an uncalculated rate relative to ground speed for the purpose of dust suppression on roads, road construction and road maintenance. This valve is shown in more detail in FIGS. 3-5.

As shown in FIGS. 3, 4A, 4B and 5, the variable spray valve 40 comprises a spray valve mounting plate 46, spray valve throw direction adjustor 62, a spray valve body 42 concentrically mounted within a height adjusting ring 44. A stationary deflector plate is mounted to a mounting frame 61 to which a servo actuator 41 and lever mechanism 43 are connected. The valve 40 is mounted onto the pipe work by means of the spray valve throw direction adjustor 62. Water enters the spray valve body 42 via a liquid flow passage through the throw direction adjustor 62. Water is discharged from the spray valve body 42 through the discharge orifice 42A onto the ground. The height of the orifice is adjusted infinitely by means of the height adjusting ring 44.

The actuator may be position controlled by a proportional signal (The most common of these is 4-20 Mill-amps, 0 to 10 volts, 0 to 5 volts). In an alternate form height adjustment mechanism may be driven by a hydraulic cylinder or motor, pneumatic cylinder or motor controlled by an actuator that is a servo system. The preferred form is an electric actuator controlled by a proportional signal but any actuator (electric, hydraulic or pneumatic) that is controlled by a servo positioning system is within the scope of the invention.

Figure 3:
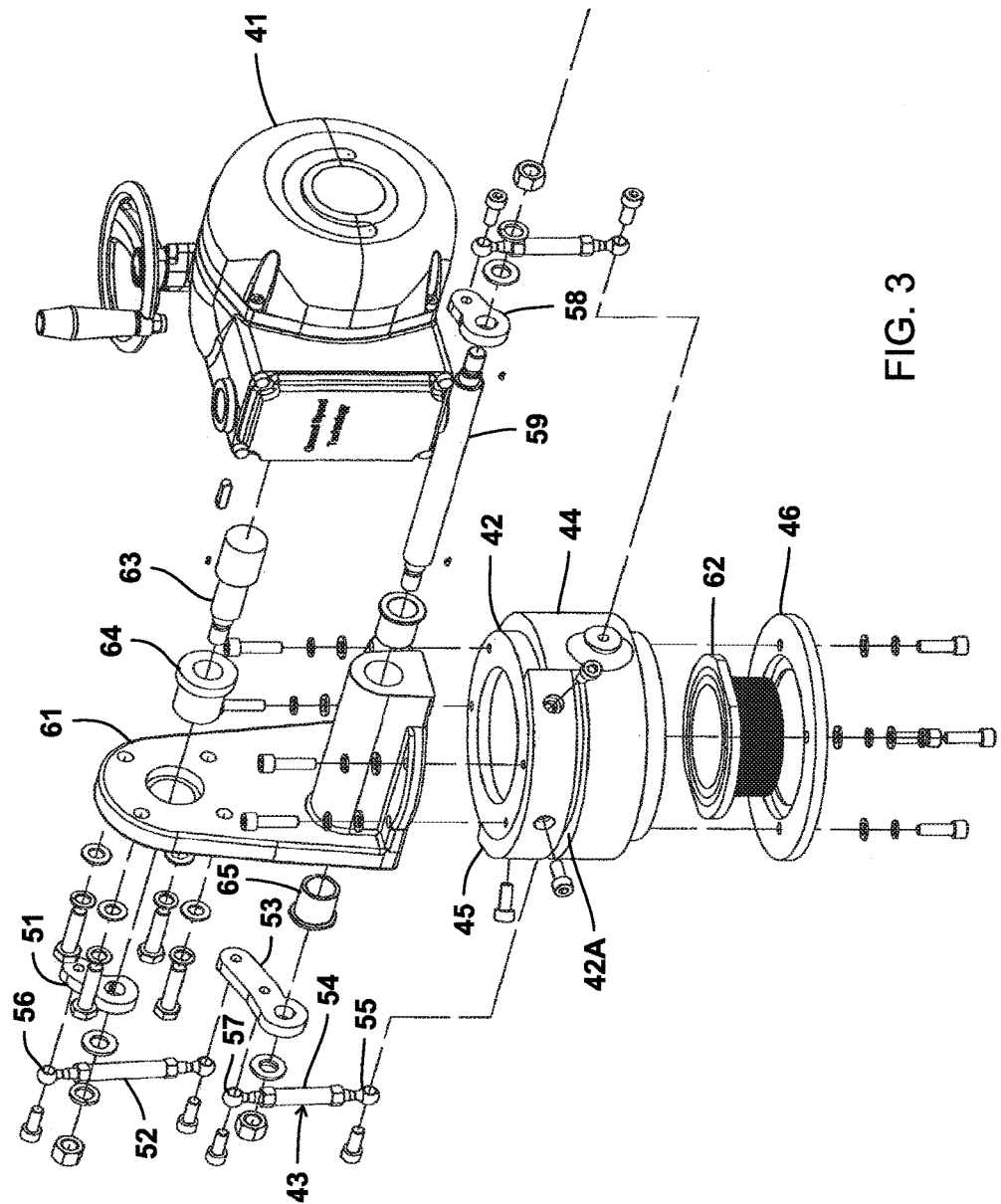
FIG. 3 is a perspective view of a variable orifice spray valve in line for assembly in accordance with one aspect of the invention.

FIGS. 3, 4A and 4B shows the variable orifice spray valve 40 assembled with the height adjusting ring 44 in the open position. A stationary deflector plate 45 is secured to the spray valve body 42 and the height adjusting ring 44 is moved in a upward manner towards the stationary deflector plate 45 by means of the lever mechanism 43 in order to reduce the orifice height. The width of the orifice 42A will remain constant. The height adjusting ring 44 is machined in such a manner that it throws the water in a upwards direction towards the deflector plate 45. This may be done by appropriate bevelling of inner concentric edge of the deflector plate adjacent the orifice. The deflector plate 45 deflects the water in a slight downward direction to produce a good quality consistent spray from the valve. The deflector plate 45 can be fabricated as a part of the spray valve body 42 or it can be manufactured as a separate item and bolted to the spray valve body 42, The height adjusting ring 44 is moved by a 90 degree position servo electric rotary actuator 41 using the lever mechanism 43 to convert the rotary motion to a linear movement. The position to which the electric actuator moves is controlled by 0 to 10 volt signal. A control signal of 10 volts will drive the actuator to a 90 degree position. The lever mechanism 43 will move the height adjusting ring 44 to its maximum down position. (Fully open). A control signal of 5 volts will drive the actuator to the 45 degree position. The lever mechanism 43 will move the height adjusting ring 44 to the mid position. (Half open).

The actuator is connected by servo shaft 63 to the lever mechanism 43 through a bearing 64 in mounting 61. The lever mechanism comprises a lever arm 51 pivotally connected to actuating arm 52 pivotally connected to gear arm 53. Gear arm 53 is pivotally mounted to a common axle 59 mounted in bearing 65 and has second actuating arm 54 pivotally connected thereto. Second actuating arm is pivotally connected to height adjusting ring 44 so as translate the movement created by rotation of servo shaft 63 into axial movement of height adjusting ring 44 on the spray valve body 42.

The lever mechanism operates in a manner similar to a gear drive. The full movement of lever 51 is 90 degrees. Assume the length of the lever arm 51 from the centre of the Servo Motor to the pivot point 56 is 1 unit in length. If the length of the lever arm 53 on the drive side is 2 units in length, and arm 54 is connected a distance 1 unit in length from the connection point 57 of arm 52 to lever arm 53, the movement of 90 degrees will be converted to 45 degrees of lever arm 53 and the force generated will be double that generated at lever 51. If the movement is now 45 degrees, the result of this gear drive is that the movement of the height adjusting ring 44 at point 55 will be the required linear axial movement.

A corresponding lever arm 58 connected to height adjusting ring 44 on the opposite side of the connection of arm 54 at point 55. The lever arm 58 is connected by a common axle 59 to lever arm 53 so that rotational movement of lever arm 53 about pivot point 60 causes a corresponding rotation of lever arm 58. This provides an even and consistent directed sliding movement of height adjusting ring 44 upwards and downwards on the outside of spray valve body 42.

It is expected that one or two of these valve assemblies will be used on each system shown respectively in FIGS. 6 and 8.

Figure 14:
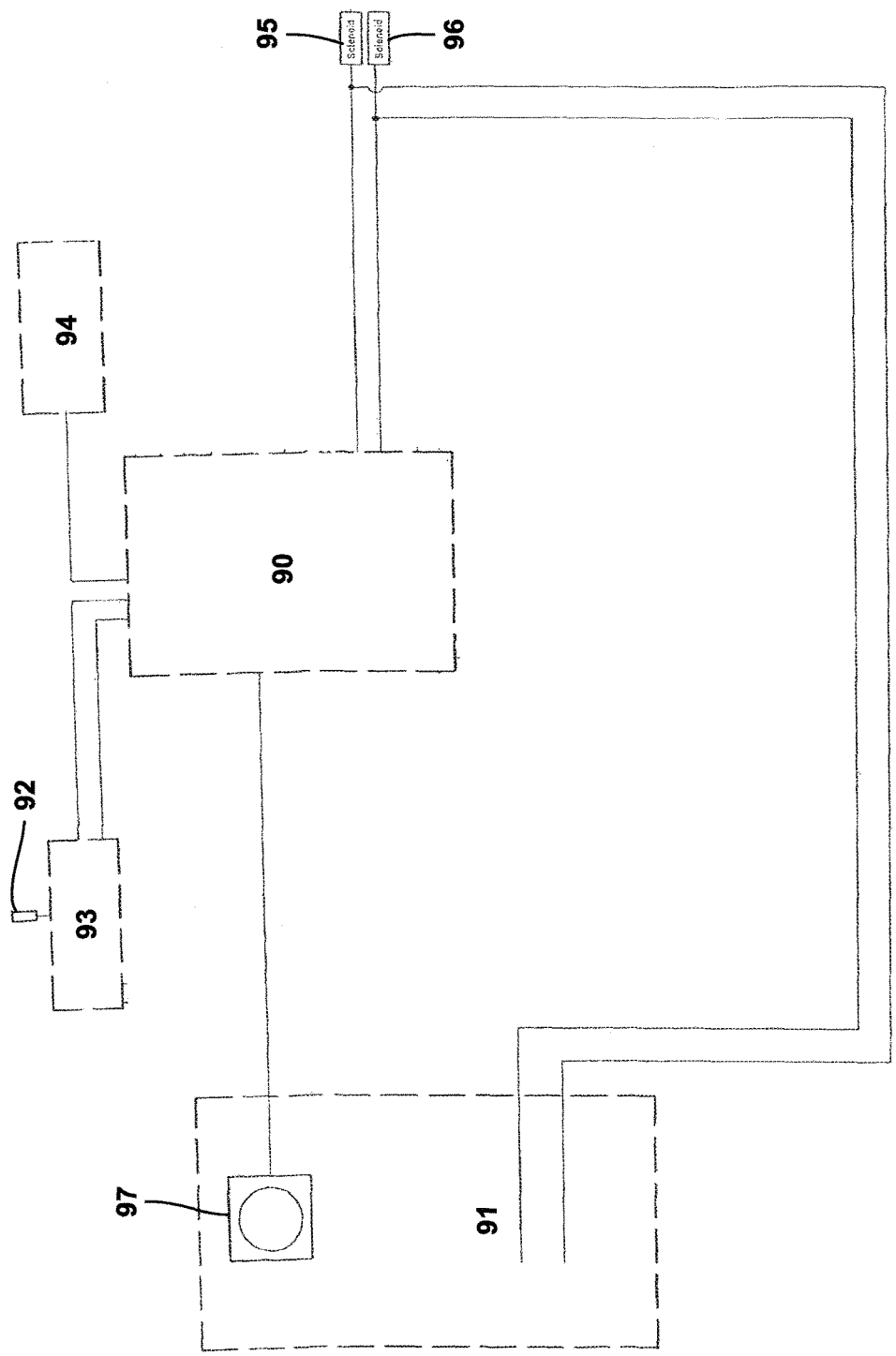
FIG. 14 is a control circuit layout from the interface unit, controller and servo actuators for the spray valves in accordance with the invention
Figure 15:
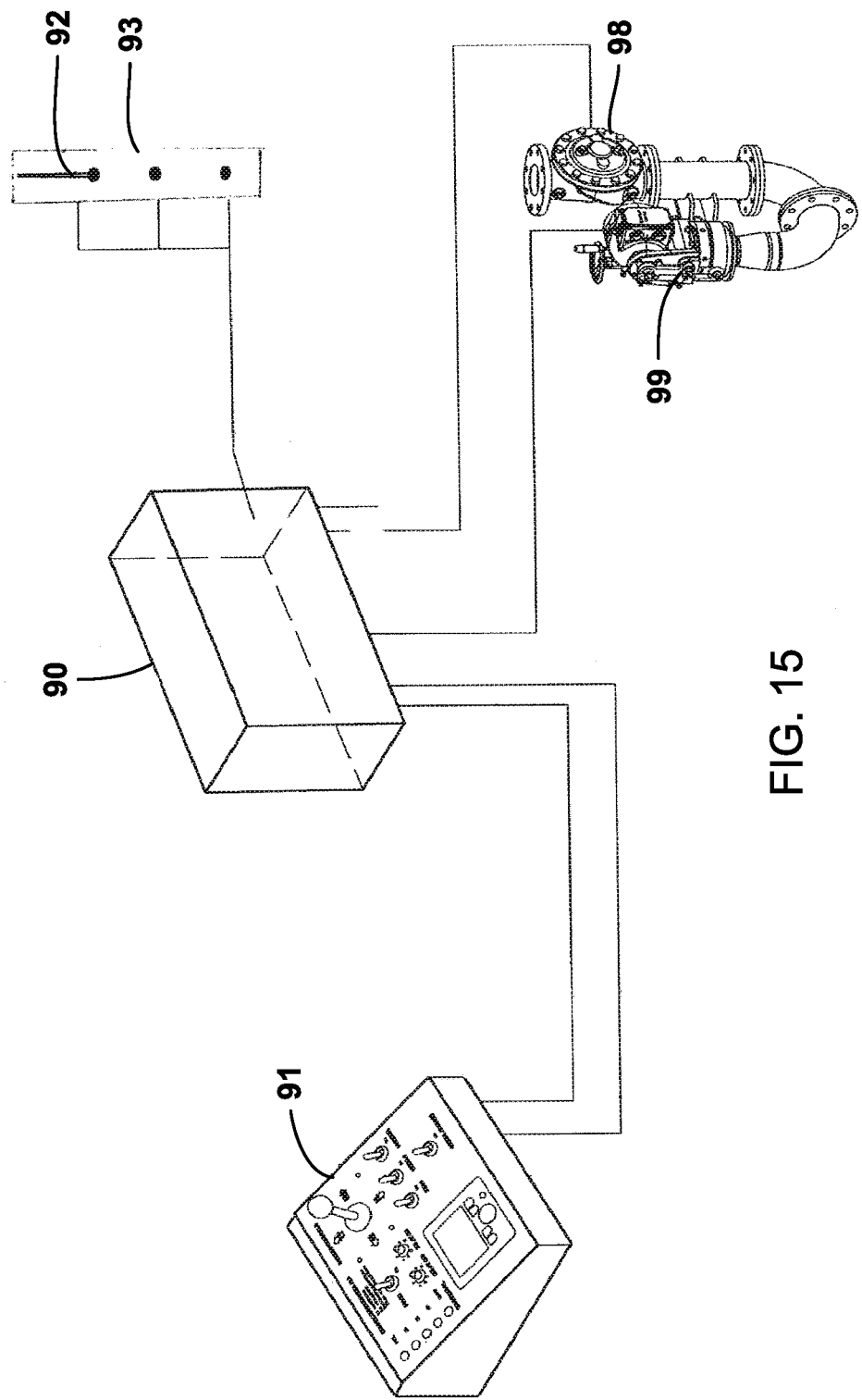
FIGS. 15 and 16 are schematic diagrams of connections between the human display interface, control unit and spray system for a single valve system and double spray valve system respectively.
Figure 16:
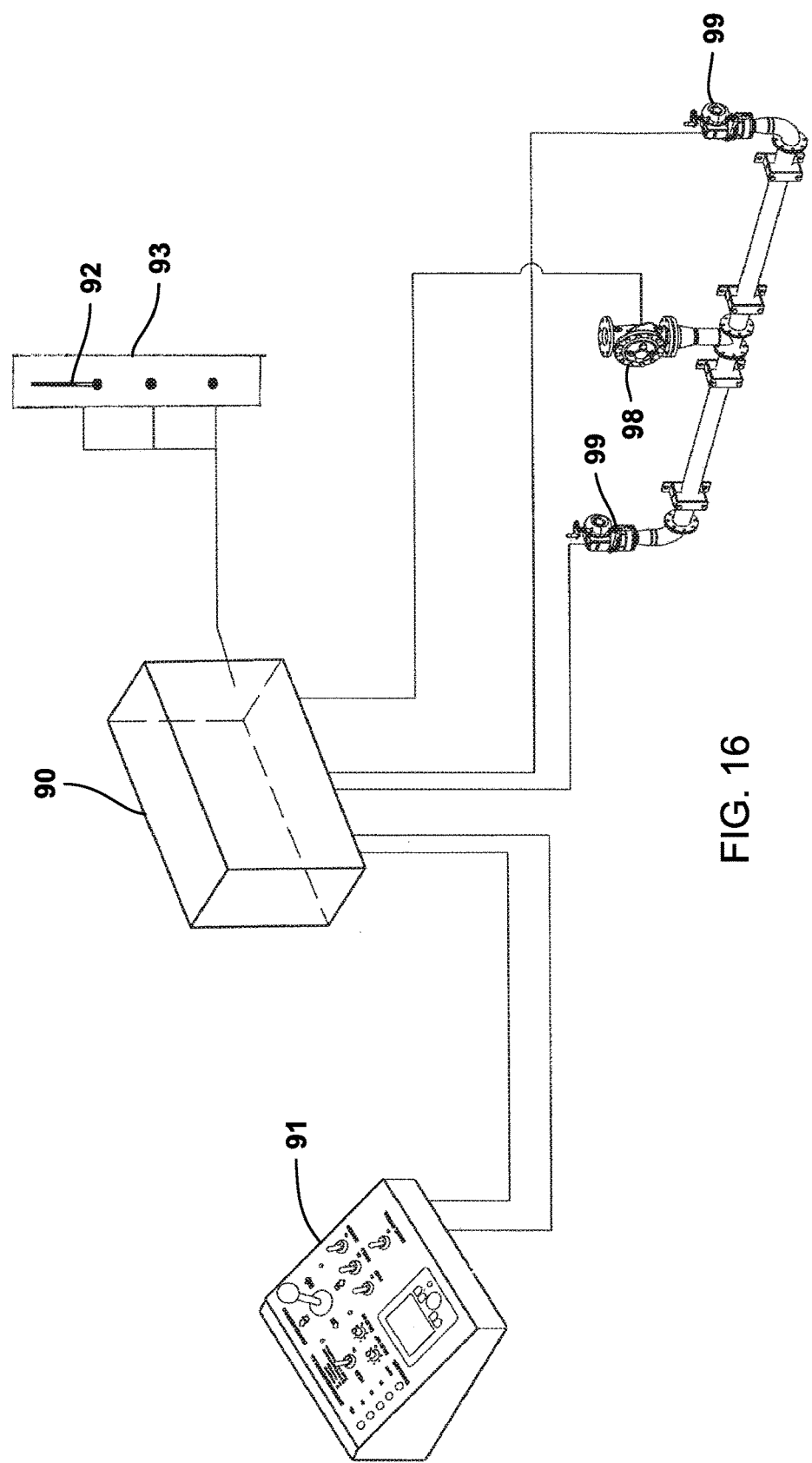

The preferred operation of the flow rate control system according to the invention will now be described. The control system is shown in FIGS. 14, 15 and 16.

The control system comprises a controller 90 connected to a ground speed control panel or human machine interface 91 which is preferably located in the cabin of the operator and includes a display. A ground speed sensor 93 is connected to the controller 90 and provided with a means which ideally detects the position of the vehicle and relate it to the speed of the vehicle. The ground speed sensor is preferably provided with an antenna 92. The controller preferably receives input from an incline sensor 94 which inputs data relating to the incline of the slope over which the vehicle is travelling.

The controller is connected to solenoids 95, 96 which actuate the pump to supply water to the conduits and also open and close the spray valves where applicable.

When a variable spray valve is used, the controller also operates the servo actuator which opens and closes the variable orifice.

FIGS. 15 and 16 show connections of the controller 90 to a single variable orifice spray valve and two variable orifice spray valves 99, respectively. In each instance, the controller is controlling each of the proportional diaphragm valves 98 to control the pressure on the orifice valve side of the diaphragm valve and also the servo actuator of the orifice valve to control the opening of the orifice.

1. Operation of Ground Speed Spray System
   1.1 The system is required to spread water on mine haulage roads at a constant rate irrespective of the ground speed.
   1.2 Control of the Ground Speed Spray System will be done by means of a HMI (Human Machine Interface) device 91. A ground speed external control panel 90 provides a connection or connections to the ground speed determinant device or devices and signal to the HMI 91. All functions necessary to operate the system can be accessed through the HMI. Operation on the ground speed spray controller 90 from the HMI using the display unit 97 is shown in FIG. 14.
   1.3 All fault conditions in the controller 90 are reported to the operator by means of the HMI 91.
   1.4 The HMI 91 has 10 profiles programmed into it. The following variables are contained within each profile including the speed at which the water will be turned on and off, maximum opening of the valve and the maximum speed at which the maximum opening will happen. It is possible to program up to 10 points between the start and end on each of the profiles.
   1.5 The system has the capability of producing 2 custom spray profiles using the HMI to produce the profile.
   1.6 The operator will have between 1 and 4 profiles available to him on the HMI depending on the site requirements. These profiles can be set up in a way that the operator can access the profiles directly on the HMI or they can be set up in a way that a password is required to change the profile and only one profile is available to the operator at any one time.
   1.7 It is expected that ground speed information will normally be obtained from a GPS speed transducer 93. The GPS speed transducer 93 is mounted in the external stainless control panel. The antenna 92 for the GPS will need to be mounted in a suitable position on the water truck. In locations where there is no GPS available, the system will accept a J1939 signal from a connection to the truck network system in order to obtain ground speed information. The ground speed external control panel may also has provision for a Doppler (Radar) speed transducer for situations where there is no GPS or J1939 signal from the truck, 1.8 The system includes a transducer 94 to detect if the water truck is moving up or down an incline. The incline transducer 94 is located in the external stainless control panel.

1.9 The system has the capability of reducing the water on the ground by up to 20% (This rate can be adjusted) when the vehicle is on an incline. This function can be turned on or off using the HMI and a password.

1.10 The system has the capability of automatically pulsing the water on the ground when the vehicle is on an incline. This function can be turned on or off using the HMI and a password.

2. Operation of the System in Auto Mode 2.1 The system can be used in a manner that the spread rate (by eye) is considered to be satisfactory at a maximum speed and the need would be to maintain that application rate throughout a speed range. This could be that the maximum orifice height is to be 18 or 15 mm at 40 kilometers per hour. There would be a need to consider the rate of spraying at speeds at the lower end of the speed variable range. Typical of this is that the water would stop spreading at 5 kilometers per hour. The system would work in a manner that at 5 kilometers per hour, the application rate would be zero and at 40 kilometers per hour, the application rate would be that from an orifice that is 18 or 15 mm high. The control system would change the height of the orifice proportional to the road speed. Typical of this is the orifice height would be half the height at 20 kilometers per hour. In other words, the height of the orifice reduces linearly with the speed of the vehicle from maximum speed to the minimum speed at which spraying continues. This method may be sufficient for many sites where this system is used.

2.2 In the mode of operation where an exact spread rate is required on the ground because there is an additive in the water that needs to be put down at a specific rate. Assume the water spread rate needs to be 0.25 liters per square meter. Assume the maximum speed at which the truck will be spreading is 40 kilometers per. Assume the width of spray is going to be 12.5 meters. Assume at 5 kilometers per hour that the water would stop spreading.

At 40 kilometers per hour the vehicle would cover a distance of $$\frac{40 \times 1000}{60} = 667 \text{ metre per minute}$$

Taking the width of the spray to be 12.5 meters, the volume of water required from the spray valve at 40 kilometers per hour would be 667×12.5×0.25=2084 liters per minute required.

Based on testing, at 2.4 bar (35 PSI), the height of the orifice need to be 16 mm in order to pass this amount of water. The profile has 10 points in it. The first point would be zero flow at 5 kilometers per hour, the second point will be 2084 liters per minute at 40 kilometers per hour. There are 8 points available in between those 2 points. The flow at 8 points on the curve can be calculated. The 8 points can be checked for accuracy with a flow meter and adjusted if they are not what is expected.

The spray valve is now a calibrated the spray valve.

The inputs outlined in 1.1-1.7 are also included and calculations made to the flow rate to account for variations in speed and incline are made and appropriate variations to the flow rate from the spray valves to maintain constant coverage.

3. Operation of the System in Manual Mode 3.1 In manual mode, power is removed from the actuator, the orifice size on the spray valve is adjusted to a particular value by means of a hand wheel on the actuator. The water and water pump are turned on and off from the control panel in the cab.

4. Alarms 4.1 Contact with satellite lost.

4.1.1 Information from the GPS transducer is fed to the controller 90 in the form of pulses. In the event the pulses stop coming into the controller 90 and GPS system has 2 or less satellites, an alarm will be sent to the HMI notifying the operator that the GPS signal is lost.

4.1.2 In the event that contact with the satellite is lost, the controller will maintain the orifice at that where it is and advise the operator to maintain speed as contact with the satellite has been lost. Graphic No xxx shows the faults that will be reported to the operator.

4.2 Excessive vehicle speed.

4.2.1 Maximum vehicle speed is a priority calculated at the set up of the system. Ground speed is measured using a GPS ground speed sensor. The point at which the ground speed becomes to high is part of the profile used to spread water on the ground.

4.2.2 In the event that the vehicle speed becomes excessive, an alarm will flash onto the HMI. This alarm will provide a message notifying the operator that he needs to slow down as the vehicle is exceeding the capabilities of the water pump.

4.3 Ground speed too low 4.3.1 In the event that ground speed becomes very low, pressure will drop to a point that the sprays will not be able to function as a spray (the water will in effect dribble out of the spray valve). The point at which the ground speed becomes too low to spread water on the ground is part of the profile used to spread water.

4.3.2 In the event the ground speed falls to a value so low that the pressure in the spray cannot generate a useful spray, an alarm will flash onto the HMI. The alarm will notify the operator that he needs to speed up the vehicle as it is approaching a point where the system will not be able to keep up with the spray requirements of the vehicle.

4.4 Alarms 4.4.1 Alarms will only function in Ground Speed Spray mode.

Parts List

A insert 1 pump/centrifugal pump/centrifugal water pump 2 diaphragm actuated hydraulic operated pressure reducing valve/pressure reducing valve 3 hydraulic operated pressure reducing diaphragm valve/pressure reducing valve/hydraulic operated proportional pressure reducing diaphragm valves/orifice valve 4 orifice 5 spray valve/electric motor 6 conduit 7 monitor bearing 11 pump/centrifugal pump/centrifugal water pump 12 diaphragm actuated hydraulic operated proportional pressure reducing valve/pressure reducing valve
13 hydraulic operated pressure reducing diaphragm valve/pressure reducing valve/hydraulic operated proportional pressure reducing diaphragm valves/fixed orifice spray valve/orifice spray valve/orifice valve
14 orifice
15 spray valve
16 conduit
17 monitor bearing
21 pump/centrifugal pump/centrifugal water pump
22 hydraulic actuated proportional pressure reducing diaphragm valve
23 hydraulic operated pressure reducing diaphragm valve/pressure reducing valve/hydraulic operated proportional pressure reducing diaphragm valves/spray valve/orifice spray valve
24 orifice
25 spray valve/electric motor
26 conduit
27 monitor bearing
40 variable spray valve/valve/variable orifice spray valve
41 servo actuator/servo electric rotary actuator
42 spray valve body
42A discharge orifice/orifice
43 lever mechanism
44 height adjusting ring
45 stationary deflector plate/deflector plate
46 spray valve mounting plate
51 lever arm/lever
52 actuating arm/arm
53 gear arm/lever arm
54 second actuating arm/arm
55 point
56 pivot point
57 connection point
58 lever arm
59 common axle
60 pivot point
61 mounting frame/mounting
62 throw direction adjustor/spray valve throw direction adjustor
63 servo shaft
64 bearing
65 bearing
70 water pump control valve
71 hoist pump
72 vehicle
73 hydraulic motor
74 water cannon
80 reservoir
81 conduit
82 hydraulically operated diaphragm valve
83 variable orifice spray valve
90 controller/ground speed external control panel/ground speed spray controller
91 ground speed control panel/human machine interface/human machine interface device
92 GPS antenna/antenna
93 GPS ground speed sensor/ground speed sensor/GPS speed transducer
94 incline switch/incline sensor/transducer/incline transducer
95 solenoid
96 solenoid
97 display unit
98 proportional diaphragm valve
99 variable orifice spray valve
100 diaphragm actuated hydraulic operated pressure reducing valve/pressure reducing valve/valve
102 valve body
103 diaphragm chamber
104 spring
105 pressure control valve
106 diaphragm
200 proportional pressure reducing diaphragm valve
202 valve body
203 diaphragm chamber
204 spring
205 force solenoid/solenoid
206 diaphragm
300 proportional pressure reducing diaphragm valve
302 valve body
303 diaphragm chamber
304 spring
305 proportional valve/On/Off Valve
306 pressure transducer
307 black box
308 diaphragm
400 proportional pressure reducing diaphragm valve
402 valve body
403 diaphragm chamber
404 spring
406 shut—off valve
407 pressure control valve
409 diaphragm It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A variable orifice spray valve including:
    a valve body having a liquid flow passage into the valve body and a spray discharge orifice formed therein, wherein liquid exits the valve body through the spray discharge orifice such that the liquid flowing from the spray discharge orifice forms a liquid flow path;
    a deflector plate in proximity to the spray discharge orifice onto which liquid exiting from the orifice is directed;
    a spray height adjuster, external to and adjacent the spray discharge orifice, and movable relative to the deflector plate into the liquid flow path exiting from the spray discharge orifice; and
    an adjustment mechanism to adjust the position of the spray height adjuster relative to the spray discharge orifice.

2. The valve of claim 1 wherein the spray height adjuster is provided with a sloped leading edge which directs the liquid path exiting from the orifice towards the deflector plate.

3. The valve of claim 1 wherein the adjustment mechanism includes an actuator responsive to a controller, the actuator being in proximity to the spray height adjuster and cooperates with the spray height adjuster through one or more lever mechanisms to move the spray height adjuster relative to the deflector plate.

4. The valve of claim 3 wherein the actuator is an electric actuator having a shaft connected to a toggle by a first connecting rod, the toggle being mounted to the spray body, the toggle being a lever connected by a second connecting rod to the spray height adjuster, rotation of the shaft of the electric actuator producing movement of the first connecting rod which in turn produces a corresponding movement of the second connecting rod through the toggle, movement of the second connecting rod causing a corresponding movement of the spray height adjuster.

5. The valve of claim 1 wherein the liquid flow path narrows as the spray height adjuster is moved into the path of the liquid exiting the valve body through the orifice.

6. A variable flow rate spray system for providing a distribution of liquid from a vehicle including
   a pump for supplying pressurised liquid to at least one variable orifice spray valve of claim 1;
   a speed determinant device providing an output representative of the relative speed of the vehicle; and
   a flow rate controller controlling the flow of liquid from the at least one variable orifice spray valve and responsive to the output of the speed determinant device, the flow rate controller including:
   a valve adjustment device, including
   a hydraulic operated pressure reducing valve between the pump and the at least one variable orifice spray valve,
   the controller being configured to provide an output to the valve adjustment device to vary the flow rate of liquid from the at least one variable orifice spray valve.

7. The variable flow rate spray system of claim 6 wherein the pressure reducing valve is responsive to the speed determinant device.

8. The variable flow rate spray system of claim 6 wherein the at least one variable orifice spray valve is responsive to the speed determinant device.

9. The variable flow rate spray system of claim 7 wherein the pressure reducing valve is a hydraulic operated proportional pressure reducing valve.

10. The variable flow rate spray system of claim 6 wherein the hydraulic operated pressure reducing valve is a hydraulic operated proportional pressure reducing valve which controls the liquid pressure to the variable orifice spray valve.

11. The variable flow rate spray system of claim 7 wherein the variable orifice spray valve is responsive to the speed determinant device.

12. A method of delivering a distribution of liquid from a moving vehicle comprising the steps of
   providing a pressurised source of liquid to at least one variable orifice spray valve of claim 1,
   providing a flow rate controller including a hydraulic operated pressure reducing valve,
   providing an output from a speed determinant device representative of the relative speed of the vehicle to the flow rate controller, the controller being configured to provide an output to a valve adjustment device to vary the flow rate of liquid from the at least one variable orifice spray valve.

13. A method of delivering a distribution of liquid from a moving vehicle using the variable orifice spray valve of claim 1 wherein the method includes:
   using the adjustment mechanism to adjust the position of the spray height adjuster relative to the discharge orifice.

14. The valve of claim 2 wherein the liquid flow path narrows as the spray height adjuster is moved into the path of the liquid exiting the valve body through the orifice.

15. The valve of claim 3 wherein the liquid flow path narrows as the spray height adjuster is moved into the path of the liquid exiting the valve body through the orifice.

16. The valve of claim 4 wherein the liquid flow path narrows as the spray height adjuster is moved into the path of the liquid exiting the valve body through the orifice.

17. A variable orifice spray valve including:
   a valve body having a spray discharge orifice formed therein, wherein liquid flows from the orifice in a liquid flow path;
   a liquid flow passage into the valve body;
   a deflector plate in proximity to the spray discharge orifice onto which liquid discharged from the orifice is directed;
   a spray height adjuster adjacent the orifice and movable relative to the deflector plate into the liquid flow path from the orifice; and
   an adjustment mechanism to adjust the position of the spray height adjuster relative to the discharge orifice,
   wherein the adjustment mechanism includes an electric actuator responsive to a controller, the actuator being in proximity to the spray height adjuster and cooperates with the spray height adjuster through one or more lever mechanisms to move the spray height adjuster relative to the deflector plate, and
   wherein the actuator is an electric actuator having a shaft connected to a toggle by a first connecting rod, the toggle being mounted to the spray body, the toggle being a lever connected by a second connecting rod to the spray height adjuster, rotation of the shaft of the electric actuator producing movement of the first connecting rod which in turn produces a corresponding movement of the second connecting rod through the toggle, movement of the second connecting rod causing a corresponding movement of the spray height adjuster.

18. The valve of claim 17 wherein the liquid flow path narrows as the spray height adjuster is moved into the path of the liquid exiting the valve body through the orifice.

19. A variable flow rate spray system for providing a distribution of liquid from a vehicle including
   a pump for supplying pressurised liquid to at least one variable orifice spray valve of claim 17;
   a speed determinant device providing an output representative of the relative speed of the vehicle; and
   a flow rate controller controlling the flow of liquid from the at least one variable orifice spray valve and responsive to the output of the speed determinant device, the flow rate controller including:
   a valve adjustment device, including
   a hydraulic operated pressure reducing valve between the pump and the at least one variable orifice spray valve,
   the controller being configured to provide an output to the valve adjustment device to vary the flow rate of liquid from the at least one variable orifice spray valve.

20. A method of delivering a distribution of liquid from a moving vehicle comprising the steps of
   providing a pressurised source of liquid to at least one variable orifice spray valve of claim 17,
   providing a flow rate controller including a hydraulic operated pressure reducing valve,
   providing an output from a speed determinant device representative of the relative speed of the vehicle to the flow rate controller, the controller being configured to provide an output to a valve adjustment device to vary the flow rate of liquid from the at least one variable orifice spray valve.

* * * * *